(12) United States Patent
Krome et al.

(10) Patent No.: US 9,583,879 B2
(45) Date of Patent: Feb. 28, 2017

(54) ELECTRICAL COMPONENT

(75) Inventors: Karsten Krome, Detmold (DE); Manuel Tünker, Dörentrup (DE); Jens Andresen, Blomberg (DE); Ralf Feldner, Detmold (DE); Thomas Führer, Blomberg (DE); Jens Franke, Bad Pyrmont (DE)

(73) Assignee: PHOENIX CONTACT GMBH & CO. KG, Blomberg (DE)

( * ) Notice: Subject to any disclaimer, the term of this patent is extended or adjusted under 35 U.S.C. 154(b) by 622 days.

(21) Appl. No.: 13/819,569

(22) PCT Filed: Aug. 30, 2011

(86) PCT No.: PCT/EP2011/064902
§ 371 (c)(1),
(2), (4) Date: Jun. 7, 2013

(87) PCT Pub. No.: WO2012/028612
PCT Pub. Date: Mar. 8, 2012

(65) Prior Publication Data
US 2013/0252458 A1    Sep. 26, 2013

(30) Foreign Application Priority Data

Aug. 30, 2010   (DE) .................. 10 2010 035 868

(51) Int. Cl.
*H01R 13/645* (2006.01)
*B60L 11/18* (2006.01)
(Continued)

(52) U.S. Cl.
CPC ...... *H01R 13/6453* (2013.01); *B60L 11/1818* (2013.01); *B60L 11/1822* (2013.01); *B60L 11/1877* (2013.01); *H01M 2/206* (2013.01); *H01R 13/6315* (2013.01); *B60L 2200/18* (2013.01); *B60L 2200/42* (2013.01); *H01R 13/5804* (2013.01); *H01R 2107/00* (2013.01); *H01R 2201/26* (2013.01);
(Continued)

(58) Field of Classification Search
CPC ............ H01R 13/6315; B60L 11/1818; B60L 11/1822; B60L 11/1877; H01M 2/206
USPC .................................... 439/248, 246
See application file for complete search history.

(56) References Cited

U.S. PATENT DOCUMENTS 3,521,216 A   7/1970   Tolegian
5,383,790 A   1/1995   Kerek et al.
(Continued)

FOREIGN PATENT DOCUMENTS

CN   201266729 Y   7/2009
CN   101562298 A   10/2009
(Continued)

OTHER PUBLICATIONS

SIPO Office Action in the counterpart Chinese Application, dated Apr. 19, 2013, nine (9) pages.

*Primary Examiner* — Briggitte R Hammond
(74) *Attorney, Agent, or Firm* — Nath, Goldberg & Meyer; Jerald L. Meyer; Christopher Thomas (57) ABSTRACT

An electrical component (1) having a housing (2) and having a plurality of plug contacts (3, 4, 5, 6). In this case, the plug contact (3-6) is held in a floating manner on a contact mount (7), and the contact mount (7) is held in a floating manner on the housing (2).

3 Claims, 4 Drawing Sheets

(51) Int. Cl.
*H01M 2/20* (2006.01)
*H01R 13/631* (2006.01)
*H01R 13/58* (2006.01)
*H01R 107/00* (2006.01)

(52) U.S. Cl.
CPC .......... *Y02T 10/7005* (2013.01); *Y02T 10/705* (2013.01); *Y02T 10/7072* (2013.01); *Y02T 90/124* (2013.01); *Y02T 90/14* (2013.01)

(56) References Cited

U.S. PATENT DOCUMENTS

| | | | |
|---|---|---|---|
| 6,422,886 B1* | 7/2002 | Macbeth et al. | 439/248 |
| 6,431,902 B1 | 8/2002 | Yeh | |
| 6,506,069 B2 | 1/2003 | Babala et al. | |
| 6,699,054 B1* | 3/2004 | Critelli | H01R 13/6315 439/248 |
| 6,773,286 B1* | 8/2004 | Wu | 439/247 |
| 7,878,860 B1* | 2/2011 | Ouellette et al. | 439/638 |
| 2008/0194130 A1* | 8/2008 | Kimura | H01R 13/6315 439/260 |
| 2009/0068870 A1* | 3/2009 | Mezhinsky | 439/247 |
| 2012/0058683 A1* | 3/2012 | Suzuki et al. | 439/660 |

FOREIGN PATENT DOCUMENTS

| | | |
|---|---|---|
| CN | 202308127 A | 7/2012 |
| DE | 1490 001 A | 5/1969 |
| DE | 35 36 142 C2 | 4/1987 |
| EP | 0 519 264 A2 | 12/1992 |
| JP | H02-49078 U | 4/1990 |
| JP | 6-5349 A | 1/1994 |
| JP | 7-211388 A | 8/1995 |
| JP | H07267020 A | 10/1995 |
| JP | 2007-280839 A | 10/2007 |
| JP | 2009-043693 A | 2/2009 |
| JP | 2009-163990 A | 7/2009 |

* cited by examiner

ELECTRICAL COMPONENT

This is a National Phase Application filed under 35 U.S.C. 371 as a national stage of PCT/EP2011/064902 filed Aug. 30, 2011, and claims priority from German Application No. 10 2010 035 868.1, filed Aug. 30, 2010, the content of each of which is hereby incorporated by reference in its entirety.

The present invention relates to an electrical component having a housing and at least one plug contact. Such an electrical component may for example comprise a battery pack or an accumulator pack that is intended to be utilized in an exchangeable manner.

In the prior art, battery packs and/or accumulator packs that are utilized in e.g. electrical vehicles, forklifts, omnibuses or in other, including stationary, machines and devices or similar, are known. After a certain operating or driving time has elapsed, such accumulator packs must be recharged. In order to ensure the uninterrupted operation, the accumulator pack may be exchanged and recharged in a separate charging station, while the vehicle or similar device is able to remain in operation with another accumulator pack.

When recharging such accumulator packs for utilization with e.g. omnibuses or other devices, as a rule, a high charging current is applied in order to ensure the speedy recharging and the early redeployment. Therefore, such accumulator packs are recharged with electrical currents of up to 400 ampere or more, whereby a layout for e.g. 500 ampere or more operational strength is provided for safety reasons. Even at low transition resistance, such high currents may result in a significant heat load that may lead to pronounced wear and tear of the contact surfaces. In most instances, such contact surfaces are provided as flat contacts that are pushed in as parallel a manner as possible against a corresponding charging contact at the charging station in order to provide as good a contact as possible.

If, however, for example a battery pack is removed from an omnibus with the help of a forklift, and the battery pack is taken to the charging station with the forklift, maneuvering at the exactitude of a millimeter is difficult and requires extremely accurate driving skills in the driver of the forklift in order to connect the battery pack. Deviations in the angle during the delivery of the accumulator pack into the charging station result in a worsened transition resistance, leading to increased and accelerated wear and tear.

Thus, it is the task of the present invention to provide an electrical component that allows for improved contact and, at the same time, the possibility for easier connection.

This task is solved through the use of the presently described electrical component, including all further embodiments of the electrical component thereof as herein described. Additional advantages and characteristics of the electrical component are derived from the example embodiments.

An electrical component in accordance with the invention comprises a housing and at least one plug contact. In that case, the plug contact is held in a floating manner on a contact mount, and the contact mount, in turn, is held in a floating manner on the housing. Especially, a plurality of plug contacts are provided in a floating manner on the contact mount.

The electrical component in accordance with the invention has many advantages. A significant advantage of the electrical component in accordance with the invention is the dual floating mounting. On the one hand, the contact is and/or the plug contacts are provided in a floating manner on the contact mount that may, for example, be formed as a plate and serves as a mount for the plug contact/s. On the other hand, the entire contact mount with all plug contacts provided thereupon, is mounted in a floating manner.

This enables through the floating mounting of the contact mount, for example, a rough adjustment of the contact mount; moreover, each individual plug contact may, in turn, on account of its own floating mounting, for example, counterbalance remaining lesser tolerances. Thereby, an especially reliable contact is made possible, and occurring transition resistances can be reduced significantly. The incidence of loss is reduced, and durability may be increased. On account of the greater useful lifespan, less maintenance and assembly input is achieved, which, in sum, results in a more advantageous operation of the electrical component.

In a preferred further embodiment, at least one compensating device is provided in order to hold the contact mount in a floating manner. The compensating device serves especially to provide lateral adjustment and/or, additionally, angle adjustment. By adjusting the angle of the contact mount, a particularly advantageous electrical component is made available, in which the electrical component to be connected to another electrical component needs only to be advanced to the latter with a lesser degree of angle exactitude. This significantly facilitates the operation when deploying such an electrical component either to a battery pack or as a battery pack. If, for example, an electrical component that is realized as a battery pack is brought to a charging station by means of a forklift, a significantly lower driving exactitude will be required, since an angle orientation of the contact mount relative to the housing, and thus to the entire battery pack, is made possible. Moreover, through the both laterally and vertically provided floating mount, both a lateral and vertical staggering are made possible.

Preferably, the compensating device or at least one compensating device is mounted especially rigidly on the housing. The contact mount is preferably held on the compensating device, so that the contact mount is held in a floating manner via the compensating device.

Advantageously, the compensating device comprises at least one centering cone that is provided at an opening of the contact mount. Especially, the centering cone holds the contact mount at the opening in order to enable an angular and lateral orientation of the contact mount via the cone. In that case, it is possible that the opening at the contact mount is shaped as a hole or groove or similar. It is possible that a centering cone is provided on both sides of the contact mount. It is, however, also preferred that on the one side of the contact mount the centering cone and on the other side of the contact mount a disc is provided so that the contact mount is provided safely between the centering cone and the disc.

Advantageously, the compensating device comprises one preload device for preloading in a base position. Especially, the preload device is realized as a spring or, at a minimum, comprises a spring. For example, a coil spring may push the centering cone in the direction of the opening of the contact mount.

Another electrical component in accordance with the invention comprises a housing and at least one plug contact. At least one oblong guide pin is provided in order to guide the electrical component when connecting it to another electrical component.

The guide pin has at an angle to its length at least one annularly enlarged outer contour.

This electrical component in accordance with the invention, too, has many advantages. A special advantage of this electrical component in accordance with the invention is the annularly enlarged outer contour, whereby the centering pin does not have the enlarged outer contour along its entire length, but only in one or several places. This means that the guide pin that is led in a bush or guide bush of another electrical component during contact, only shows a lesser tolerance at the points of the annularly enlarged outer contour.

Before the annularly enlarged outer contour reaches the lead bush and/or bush, an increased tolerance is present that is diminished considerably when it reaches them, so that a reliable and precise connection is made possible.

Depending on the embodiment and on conditions present, the outer diameter of the guide pine may vary. If, for example, the electrical component is utilized in connection with a battery pack that reaches and/or exceeds a weight of 50, 100, 150 or even 200 kg, an outer diameter is preferred that exceeds 10 mm and especially 15 mm and preferably also 20 mm as outer diameter. Even greater outer diameters of 25 mm, 30 mm, 40 mm or 50 mm are possible. A certain weight of the electrical component requires a corresponding stability of the guide pin in order to ensure a safe guiding action.

If, however, the weight and the necessary forces at the centering of the electrical component are lower, a considerably smaller outer diameter of e.g. 5 mm or 2 mm or an even smaller outer diameter may be provided, so that the guide pin may also be called e.g. a leader pin.

In all embodiments it is preferred that the guide pin is shaped as either a tube or a cylinder and, in particular, comprises a tip that is preferably conical or similarly shaped. A rounded or graduated tip is also possible.

Preferably, the annularly enlarged outer contour is achieved through a wall-shaped thickening or similar. It is, however, also possible that the annularly enlarged outer contour is foamed by individual nubs that are protruding outwardly from the circumference that form in their entire structure an annular or ring-shaped outer contour.

Advantageously, two or more annularly enlarged outer contours that are placed at a distance from each other are provided on at least one guide pin. In this case, the annularly enlarged outer contours preferably have a defined distance.

In all embodiments it is provided that especially two or more guide pins are provided.

Preferably, the guide pin at the annularly enlarged outer contour has an outer diameter that is increased by less than 10%. The difference in diameter is preferably less than 10% and especially less than 5%. Preferably, the difference in diameter is less than 2%, and especially the diameter difference is located in a range between 0.03% and 1.5%. If, for example, an outer diameter of 20 to 25 mm is present, the outer diameter at the annularly enlarged outer contour may be enlarged by 0.1 to 3 mm. Thereby, an adjustment of the electrical component of 0.1 to 3 mm, respectively, is achieved from the normal outer contour. When the annularly enlarged outer contour reaches the bush and/or the guide bush, the tolerance is decreased considerably, so that a repeated better orientation of the electrical component occurs.

In all embodiments, at least one guide pin has a conical or rounded tip. Especially preferably, the guide pin has throughout its length essentially round-like, rounded or preferably also round cross-sections.

According to another aspect, it is the task of the invention to provide a connector plug having a reliable pull relief that is easily mounted.

This task is solved by the presently described connector plug, including further embodiments and realizations thereof as herein described.

The connector plug in accordance with the invention comprises a connector housing and at least one contact plug and at least one pull relief device. In this case, the connector housing comprises a base body and a contact body. The pull relief device comprises a pull relief that is embedded in the base body and that is secured in an interlocking manner in the base body through the contact body.

The connector plug in accordance with the invention also has many advantages. Special advantages of the connector plug in accordance with the invention include the easy mounting and safe operation. By embedding the pull relief in the base body and the subsequent introduction of the contact body into the base body, the contact body precludes the removal of the pull relief from the base body. The interlocking connection that is secured through the contact body in the base body, provides a reliable pull relief.

Preferably, the pull relief comprises a strip-shaped metal sheet. Such a strip-shaped metal sheet is particularly simple to manufacture and produces only few scraps with the preferably provided realization in accordance with the invention.

Advantageously, at least one holding catch engages an opening on the pull relief in order to achieve the interlocking connection. In this case, the pull relief may be introduced into the base body in order to establish the connection. By placing them against a peripheral, the holding catches are being led through the openings of the pull relief. A subsequent introduction of the contact body into the base body precludes the pull relief from being swiveled away and again removed from the base body and thus the connector plug.

In a particularly preferred embodiment, the base body is concave, in order to receive therein the pull relief and the contact bodies.

All embodiments provide the individual contacts on the contact body. In this case, the contacts may be provided for the transmittal of data and/or the transmittal of output.

The electrical component encompasses preferably several plug contacts and at least one connector plug.

Additional advantages and characteristics of the invention are derived from the description of the embodiment model that is explained below with respect to the attached Figures.

Therein it is shown as follows.

Below, an embodiment example of the present invention is explained by referring to the attached FIGS. 1 through 11.

Figure 1:
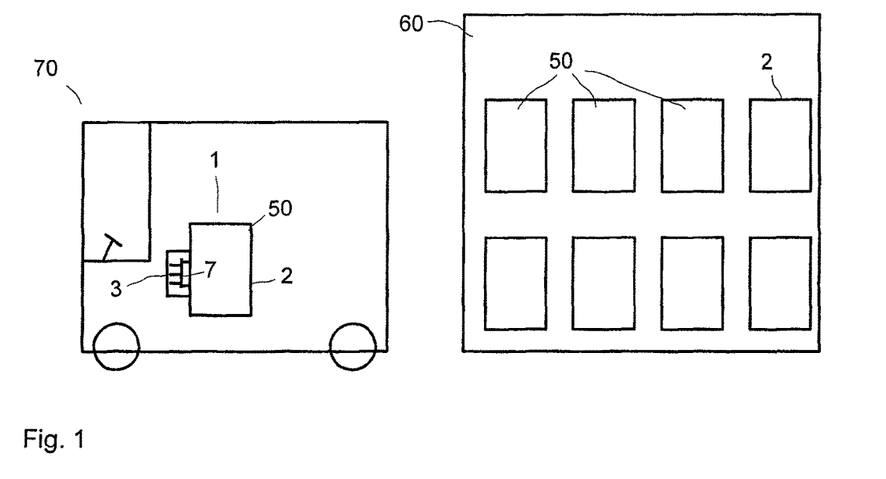
FIG. 1 A highly schematic depiction of a vehicle with an accumulator pack as electrical component.

FIG. 1 shows a strongly schematic depiction of a vehicle 70 and a charging station 60. The vehicle 70 comprises a battery pack 50 that is provided in an exchangeable manner on the vehicle 70. If applicable, several battery packs 50 may also be provided on the vehicle.

Here, the battery pack 50 is an electrical component 1 that comprises a housing 2 and plug contacts 3 on a contact mount 7.

In addition to the utilization of the electrical component 1 in accordance with the invention, on a vehicle, the utilization on a stationary device or other mobile devices or installations is also possible.

Here, in the embodiment example, the battery pack 50 as electrical component 1 may have a high weight of 100, 150 or even 200 kg. For purposes of exchanging the battery pack 50, a forklift (not depicted here) may be used that removes the battery pack 50 from the vehicle 70 and takes it to the charging station 60 that may e.g. be realized in a shelf-like manner and that comprises different charging positions for battery packs 50.

The forklift or a conveyor belt or transport belt or similar device transports the battery pack 50 to an unoccupied charging position and connects the battery pack 50 with the plug contacts 3 through 6 to the charging station 60.

Thereby, the electrical component 1 is reliably connected with the charging station 60. This is ensured by the dual floating arrangement of the plug contacts 3 through 6 via the contact mount 7 on the housing 2 of the electrical component 1.

Figure 2:
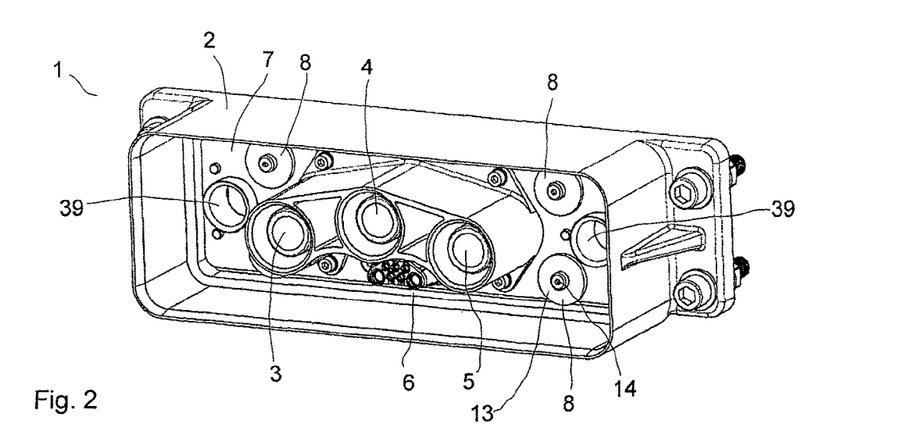
FIG. 2 A perspective view of an electrical component in accordance with the invention.

FIG. 2 shows the area of the connection of the electrical component 1, whereby the plug contacts 3 and 5 in the case of direct current serve as plus or minus poles, respectively, while the plug contact 4 preferably serves as PE contact. It is also possible to provide additional plug contacts. In the present embodiment example, an additional plug contact 6 is provided that here also may comprise several poles and that is realized as a connector plug 28.

Opposite the housing 2, the contact mount 7 that is here realized in plate form is held in a floating manner via, according to the embodiment example, a total of four compensating devices 8. The compensating devices 8 are connected firmly and rigidly through screws 14 with the housing 2. The discs 13 of the compensating devices 8 prevent the contact mount 7 from being detached unintentionally from the housing 2.

On the electrical component 1, bushes 39 in the form of guide bushes are provided with which at least a rough leading of the electrical component takes place when connecting the electrical component 1 to an electrical component 1 *a*.

Figure 3:
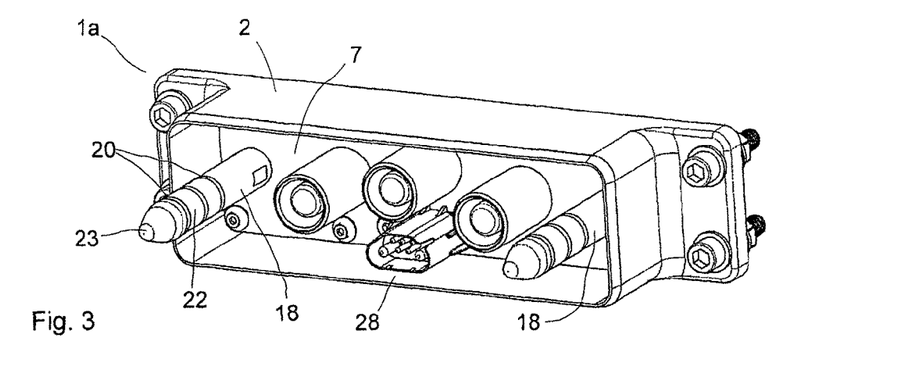
FIG. 3 A perspective view of another electrical component.

An electrical component 1*a* is depicted in FIG. 3, and it comprises guide pins 18, two of which are provided here in this embodiment example. It is also possible to provide an electrical component 1 or 1*a* with only one guide pin 18 or, however, with three or four guide pins 18.

The electrical component 1*a* also has plug contacts 3 through 6 that may be connected in a plug-like manner with the corresponding plug contacts at the electrical component 1. If applicable, the electrical component 1*a* also may comprise a contact mount 7 which then, in turn, is held in a floating manner opposite the housing 2 of the electrical component 1*a*.

The guide pins 18 are throughout most of their length realized as tubes and have here three annular thickenings 20 in each of which an outer diameter 27 is significantly greater than the other outer diameter 26. At the tip of the guide pin 18, a tip 23 is provided that may be rounded, conical or similarly shaped, and with which an initial and simple centering of the electrical component 1 takes place when the electrical component 1 with the bushes 39 is slid onto the tips 23 of the guide pins 18. The annular thickenings 20, having only a small tolerance between the outer diameter 27 and the annular thickening 20 and the inner diameter of the bush 39, allow for a very precise and reproducible contacting of the electrical component 1.

Due to the fact that the outer diameter 27 is only present at the annular thickenings 20, the electrical component 1 is reliably prevented from tilting during contact. Therefore, the mounting forces remain insignificant.

Figure 4:
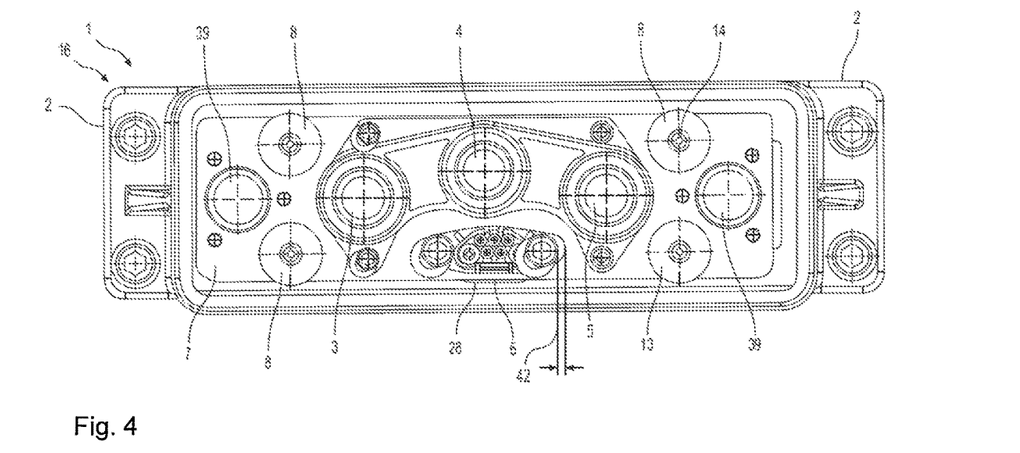
FIG. 4 A top view of the electrical component according to FIG. 2 in the base position.

FIG. 4 shows a top view onto the contact area of the electrical component 1 with the housing 2 in the base position 16. In the base position 16, the contact mount is in a resting position relative to the housing 2. This means that the compensating devices 8 are not deflected.

Each of the plug contacts 3, 4, 5 and 6, respectively, is arranged in a floating manner vis-a-vis the contact mount 7. In at least one direction and here in both the lateral and vertical direction, a certain adjustability of the individual plug contact 3 through 6 vis-a-vis the contact mount 7 is present. The aforesaid adjustability may e.g. be in the range of between 0.1 and 0.5 mm. Thereby, an exact adjustment of each individual plug contact 3 through 6 is made possible, even after the orientation of the contact mount 7 through the guide pin 18, thereby preventing especially high mounting forces from arising during contact. In this case, an adjustment by a distance 42, which may measure up to e.g. 0.5 mm, took place, both vertically and laterally. In other specific embodiments, smaller and/or also greater adjustment movements are possible. The contact mount, 7, however, may be preferably deflected by a few millimeters.

Figure 5:
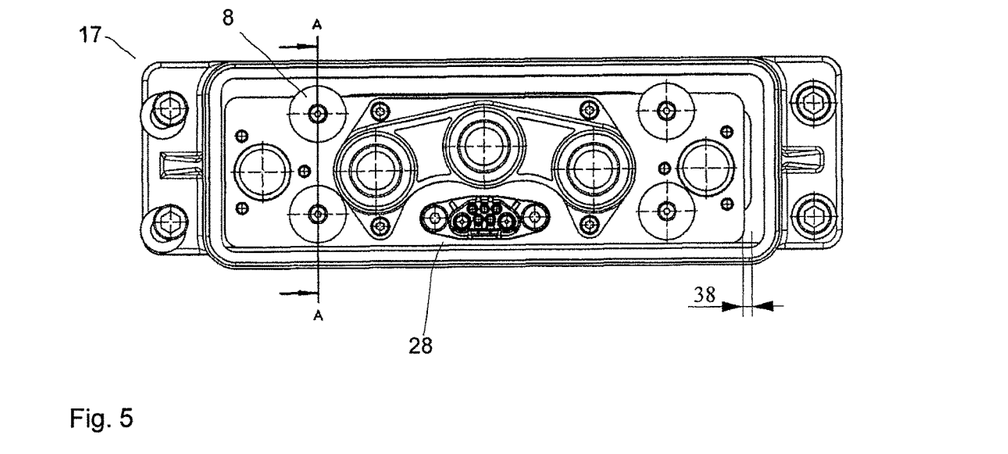
FIG. 5 A top view of the electrical component according to FIG. 2 in swiveled-out position.

FIG. 5 depicts the deflected position 17 in which the contact mount 7 was deflected vis-à-vis the resting position 16. In this case, an adjustment by a distance 38, which may measure up to e.g. 5 mm, took place, both vertically and laterally. In other specific embodiments, smaller and/or also greater adjustment movements are possible.

Figure 6:
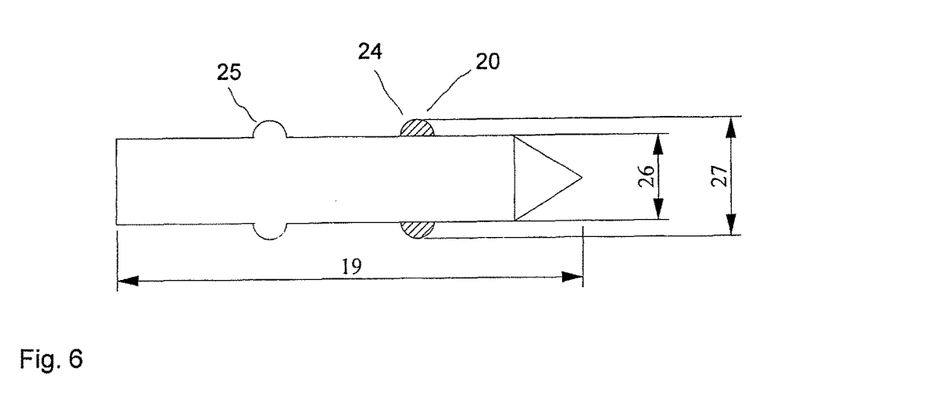
FIG. 6 A schematic view of a guide pin of an electrical component.

FIG. 6 shows a strongly schematic lateral view of a guide pin 18 with annular outer contours 20 and 25.

In this case, such an outer contour 20 and/or 25 may arise through an annular thickening, but also through individual nubs 24 that are distributed around the circumference that here are depicted schematically in cross-sectional form. It is of the essence that in the locations of the annularly enlarged outer contours 20 and 25, an enlarged outer diameter 27 is present that e.g. is by 0.1 to 0.5 mm larger than the outer diameter 26 of the actual outer surface of the guide pin 18. The guide pin 18 extends along a longitudinal stretch 19, whereby in certain and pre-defined distances the annularly enlarged outer contours 20 and/or 25 are provided.

Especially, the first or an annularly enlarged outer contour 20 and/or 25 is provided in a manner such that a simple contacting of the plug contacts 3-6 is allowed. At the very moment when the plug contacts are establishing contact, the annularly enlarged outer contour 20 and/or 25 ensures a tighter fit at the bush 39.

Figure 7:
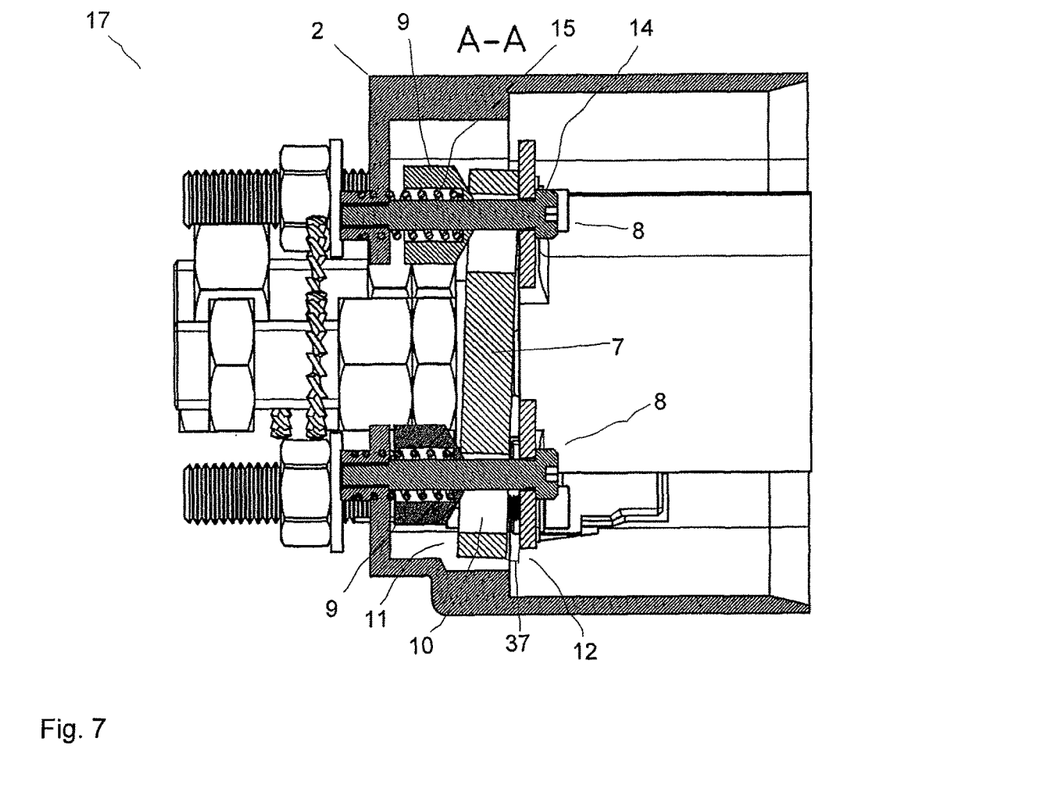
FIG. 7 The crosscut A-A from FIG. 4.

FIG. 7 depicts the cross-section A-A from FIG. 5. In this case, the deflected position 17 is depicted in which the contact mount 7 was moved laterally by a distance 38 in which, as now may be seen in FIG. 7, the contact mount 7 was deflected by an angle 37 vis-à-vis the housing 2. When connecting the electrical component 1 to e.g. a charging station 60, this enables an angle deviation by an angle 27 that may measure e.g. 1 degree or 5 degrees or a similar magnitude. This enables a clearly more flexible contacting of an electrical component 1, resulting especially with large-scale and heavy electrical components, such as battery packs 50, in a considerable simplification of the contact process.

As can be seen from FIG. 7, each compensating device 8 has one centering cone 9 that is arranged on one side 11 of the contact mount 7. On the other side 12, a disc 13 is provided that covers the opening 10 in the contact mount 7 and thus holds the contact mount firmly to the housing 2, although an angle and lateral orientation is possible. Preload devices 15 that are realized as coil springs serve to preload the compensating device into the base position 16.

Figure 8:
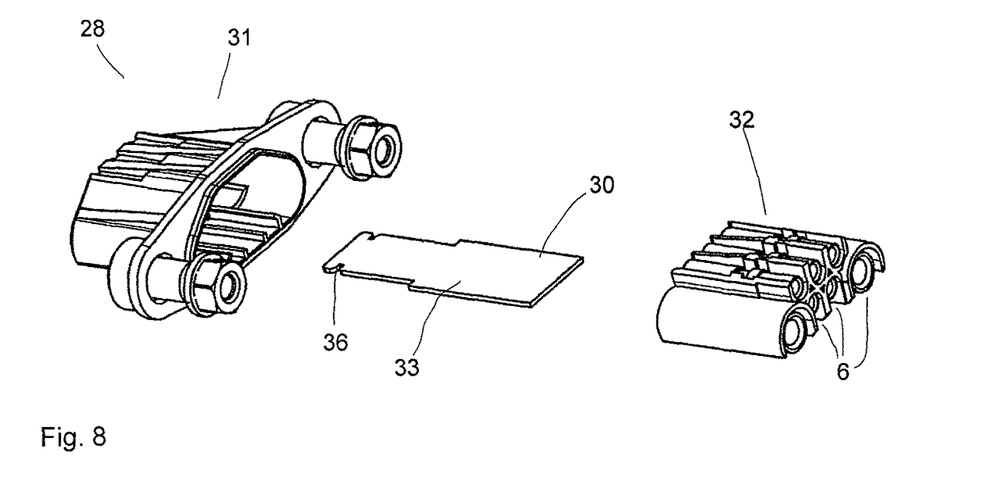
FIG. 8 The exploded view of a connector plug in accordance with the invention.

FIG. 8 depicts a connector plug 28 that was here sketched as plug contact 6 into the prior Figures. The connector plug 28 has a base body 31 and a contact body 32 in order to receive a plurality of plug contacts. Furthermore, a pull relief device 30 is provided that here comprises a pull relief 33 and holding catches on the base body 31.

The pull relief 33 is realized as a strip-shaped flat metal sheet 34, thus enabling a simple stamping production process with low waste.

Close to one end of the pull relief 33, openings 36 at the pull relief 33 are provided that act together with the holding catches 35 of the base body 31 in order to produce an interlocking connection between the pull relief 33 and the base body 31 and/or the contact housing 29, respectively.

Figure 9:
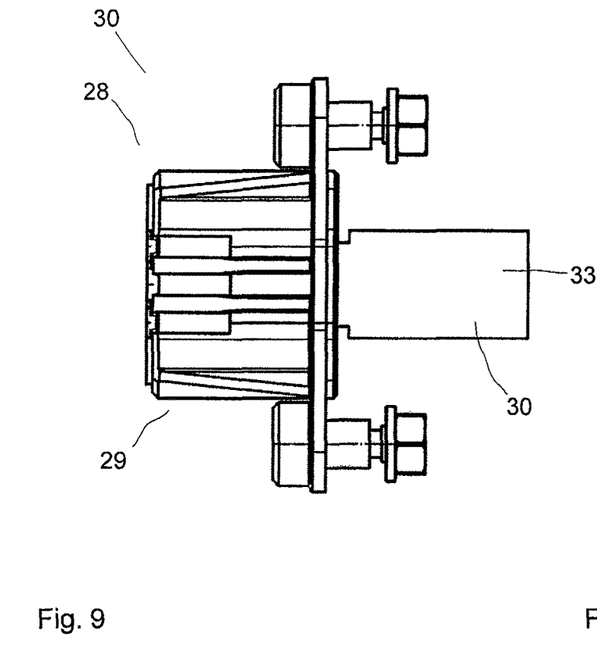
FIG. 9 A lateral view of the connector plug according to FIG. 8.
Figure 10:
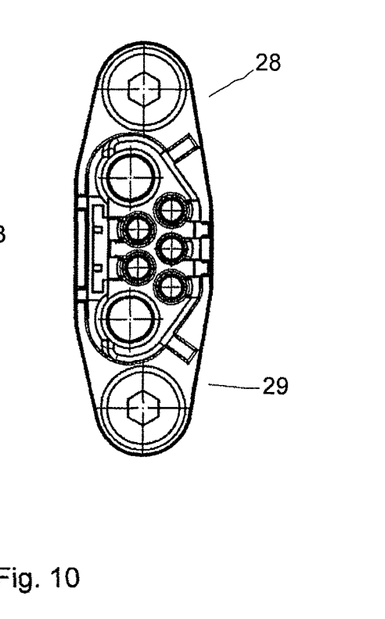
FIG. 10 A top view of the connector plug according to FIG. 8.

The connector plug 28 is depicted in FIG. 9 in a lateral view, and in FIG. 10 in a top view. The connector plug 28 may in addition to power output connections that are here sketched in larger—also have a number of data connector plugs so that it may be possible to provide an electronic device or a small computer or a load device or similar with the necessary energy, while at the same time enabling the exchange of data that were generated or processed.

Figure 11:
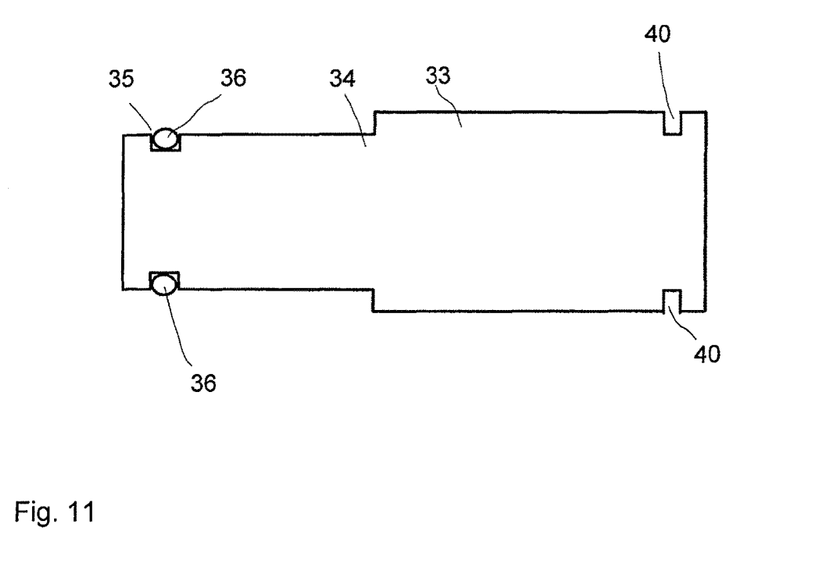
FIG. 11 A schematic top view of the pull relief of the connector plug according to FIG. 9.

While the holding catches 35 are provided in a mounted condition at the openings 36 in and/or at the base body 31, the other end of the pull relief 33 protrudes from the base body 31. At the other end, grooves 40 may be provided in order to there provide the connection of a cable binder or other components. For purposes of assembly, the pull relief with the openings 36 is first inserted into the base body 31 of the connector plug 28. Subsequently, the openings 36 are put over the holding catches 35 inside the base body 31, and the pull relief 33 is placed against an inner wall of the base body 31. Subsequently, the contact body 32 with the contact cases that are not depicted here, may be introduced into the concave base body 31, so that the contact body 32 and the pull relief 33 are received in an interlocking manner at the base body 31. By mounting the connector plus 28 on a circuit board or on the contact mount 7, the contact body 32, too, is safely received on the base body 31.

In sum, the invention enables the use of an electrical component 1 in the form of e.g. battery packs or accumulator packs 50 or other electrical components in which a reliable and safe contact action with low transitional resistances takes place, wherein the tolerances to be adhered to when generating the plug connection are relatively minor since the contact mount 7 and the individual plug contacts 3 through 6, respectively, are held in a floating manner. Thereby, the mounting forces, when establishing the connection, and also the separation forces during the separation of the connector plugs are reduced significantly, while at the same time providing a contact surface with high conductivity.

While the tolerances of the plug contacts that are contacting one another are e.g. around $1/10$ or $1/100$ mm, respectively, considerably higher tolerances may be chosen for establishing the connection, so that e.g. a lateral shift of 5 mm or similar may be compensated.

Each individual plug contact 3 through 6 may e.g. be arranged on a bore with over-dimension, thus moving in all lateral directions by a certain degree.

The connector plug in accordance with the invention has a simple structure and is easily assembled and disassembled, thereby ensuring reliable function with little assembly effort.

LIST OF TERMS

Connecting terminal 1
Electrical component 1
Housing 2
Plug contact 3-6
Contact mount 7
Compensating device 8
Centering cone 9
Opening 10
Side 11
Side 12
Disc 13
Screw 14
Preload device 15
Base position 16
Deflected position 17
Guide pin 18
Length 19
Annular outer contour 20
Cylinder 21
Tube 22
Tip 23
Nub 24
Annular outer contour 25
Outer diameter 26
Outer diameter 27
Connector housing 29
Pull relief device 30
Base body 31
Contact body 32
Pull relief 33
Strip-shaped metal sheet 34
Holding catch 35
Opening 36
Angle 37
Lateral shift 38
Bush 39
Groove 40
Battery pack 50
Loading station 60
Vehicle 70

The invention claimed is:
1. Electrical component comprising a housing and at least one plug contact wherein the plug contact is held in a floating manner on a contact mount and the contact mount is held in a floating manner on the housing:
 wherein for a floating holding of the contact mount on the housing at least one compensating device is provided;
 wherein the compensating device has at least one centering cone that is provided at an opening of the contact mount; and
 wherein on one side of the opening the centering core is provided and on another side of the opening a disc is provided.

2. Electrical component according to claim 1, wherein the compensating device is attached to the housing and wherein the contact mount is held on the compensating device.

3. Electrical component according to claim 1, wherein at least one preload device is provided in order to preload the compensating device in a base position.

\* \* \* \* \*

UNITED STATES PATENT AND TRADEMARK OFFICE
CERTIFICATE OF CORRECTION

PATENT NO. : 9,583,879 B2
APPLICATION NO. : 13/819569
DATED : February 28, 2017
INVENTOR(S) : Karsten Krome et al.

Page 1 of 1

It is certified that error appears in the above-identified patent and that said Letters Patent is hereby corrected as shown below:

In the Claims

Claim 1, Column 8, Line 65, please replace the word "core" with "cone".

Signed and Sealed this
Twenty-third Day of May, 2017

Michelle K. Lee
*Director of the United States Patent and Trademark Office*